(12) United States Patent
Jabbour et al.

(10) Patent No.: US 11,423,147 B2
(45) Date of Patent: Aug. 23, 2022

(54) METHOD FOR EXECUTING SINGLE-USE SYSTEMS

(71) Applicant: GOVERMENT OF THE UNITED STATES AS REPRESENTED BY THE SECRETARY OF THE AIR FORCE, Rome, NY (US)

(72) Inventors: Kamal T Jabbour, Fabius, NY (US); Erich D Devendorf, Caroga Lake, NY (US); Andrew N Zeliff, Marietta, GA (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 255 days.

(21) Appl. No.: 15/950,675

(22) Filed: Apr. 11, 2018

(65) Prior Publication Data

US 2018/0322288 A1   Nov. 8, 2018

Related U.S. Application Data

(60) Provisional application No. 62/500,007, filed on May 2, 2017.

(51) Int. Cl.
G06F 21/57   (2013.01)

(52) U.S. Cl.
CPC ........ *G06F 21/57* (2013.01); *G06F 2221/034* (2013.01)

(58) Field of Classification Search
CPC ........ G16H 10/60; G16H 20/10; G16H 50/20; G06F 21/57; G06F 2221/034
See application file for complete search history.

(56) References Cited

U.S. PATENT DOCUMENTS

| | | | |
|---|---|---|---|
| 10,431,336 B1* | 10/2019 | Murrish | G16H 10/60 |
| 2009/0012804 A1* | 1/2009 | Read | G06Q 10/067 705/348 |
| 2009/0094004 A1* | 4/2009 | Sankaranarayanan | G05B 15/02 703/2 |
| 2009/0125332 A1* | 5/2009 | Martin | G06Q 10/00 705/3 |
| 2010/0211867 A1* | 8/2010 | Heuer | G06F 40/205 715/234 |
| 2011/0125484 A1* | 5/2011 | Coen | G06F 21/56 704/3 |
| 2011/0283059 A1* | 11/2011 | Govindarajan | G06T 1/20 711/104 |
| 2015/0019257 A1* | 1/2015 | Doyle | G16H 50/20 705/3 |
| 2016/0239276 A1* | 8/2016 | MacLean | G06F 9/4494 |
| 2017/0329954 A1* | 11/2017 | Lao | G06F 21/44 |
| 2019/0235878 A1* | 8/2019 | Lin | G06F 3/011 |

* cited by examiner

*Primary Examiner* — Joseph P Hirl
*Assistant Examiner* — Sayed Aresh Beheshti Shirazi
(74) *Attorney, Agent, or Firm* — Adam Gene Pugh

(57) ABSTRACT

A method for manufacturing and executing single-use systems. Invention provides provably secure system design, instantiated in heterogeneous hardware that exists solely for the lifetime of a mission. More specifically, the present invention provides a functional mission analysis, formal specification and mathematically rigorous machine-checkable representation of a hardware mission instantiation to significantly reduce the vulnerabilities of a mission.

14 Claims, 1 Drawing Sheet

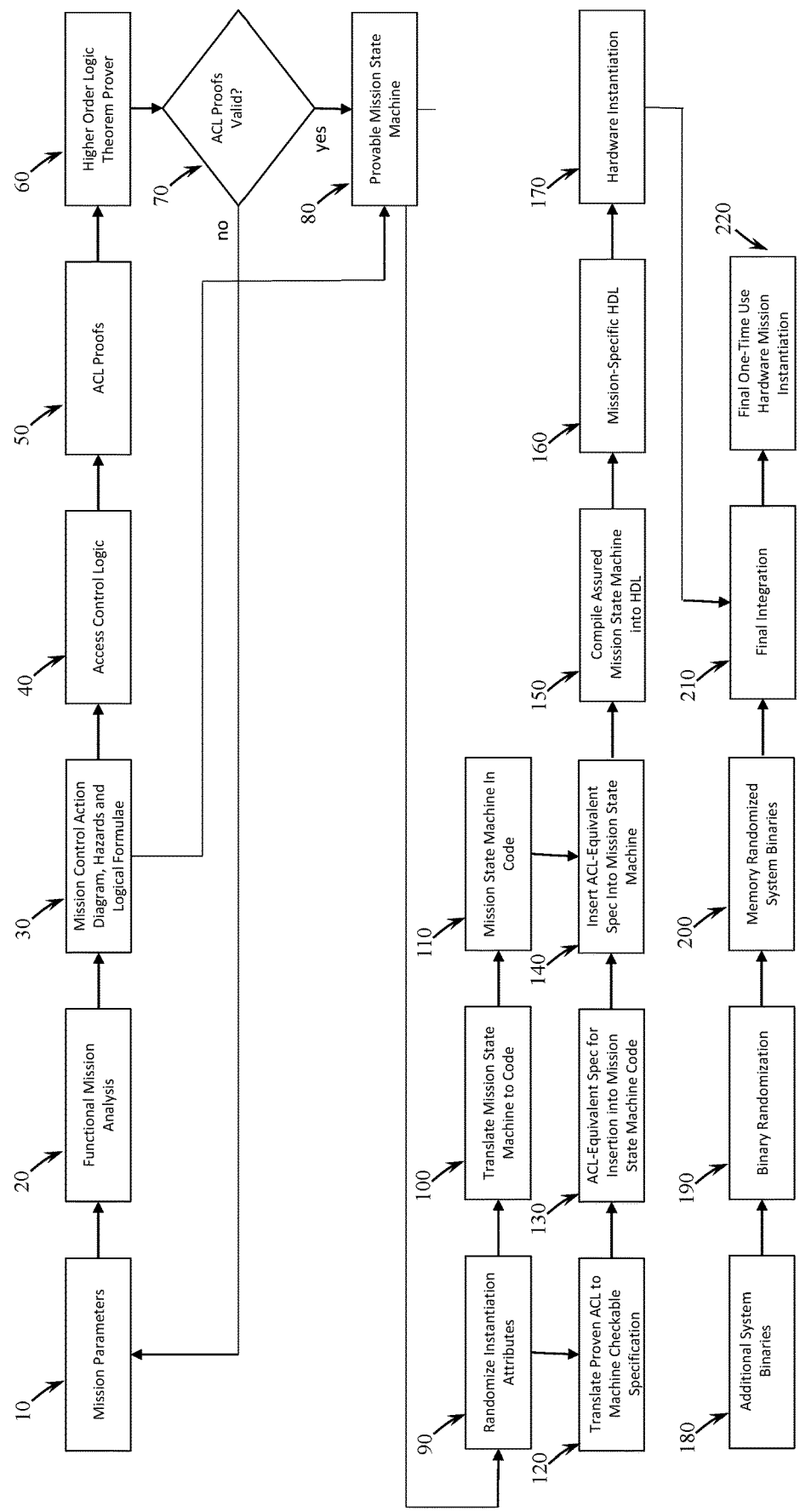

METHOD FOR EXECUTING SINGLE-USE SYSTEMS

PRIORITY CLAIM UNDER 35 U.S.C. § 119(e)

This patent application claims the priority benefit of the filing date of provisional application Ser. No. 62/500,007 having been filed in the United States Patent and Trademark Office on May 2, 2017 and now incorporated by reference herein.

TECHNICAL FIELD OF THE INVENTION

This invention relates generally to the field of provably secure system design, instantiated in heterogeneous hardware that exists solely for the lifetime of a mission. More specifically, the present invention relates to functional mission analysis, formal specification and mathematically rigorous machine-checkable representation of a hardware mission instantiation to significantly reduce the vulnerabilities of a mission.

BACKGROUND OF THE INVENTION

The current reactive approach to computer and network security and cyber defense continues a self-perpetuating cycle of failure. Furthermore, the complacent acceptance of inevitable failure through the commonly accepted viewpoint that systems will "always be vulnerable" is unacceptable for national security.

Current Air Force systems leverage proprietary and commercial off the shelf hardware and software that is riddled with vulnerabilities. Additionally, these systems are homogenous—a vulnerability discovered in one component affects many systems, and an exploit against one instance of a system will work against all the other instances of that system. This asymmetry (one affecting many), gives our adversary the upper hand.

Additionally, current system designs typically lack the rigor and qualities necessary to assure missions and information in contested environments. Systems are often designed and developed for reliability with little or no security in mind. In cases that consider security, policy or constraints often waive it away with a cursory bolt-on solution that provides no real assurance properties. For example, HBSS, a commonly implemented Air Force bolt-on security system, despite frequent, regular updates, misses the majority of newly created malware and provides excellent C2 capability for adversarial actions [1].

What is therefore needed is a method that realizes a vision of enduring mission assurance—one that shifts the paradigm in favor of American missions, while holding at risk those missions of our adversaries. One-time use hardware that generates just-in-time for the specific mission at hand provides a critical component of enduring assurance.

OBJECTS AND SUMMARY OF THE INVENTION

It is therefore a primary object of the present invention to provide a method for executing single use systems.

It is another object of the present invention to provide a method for executing single use systems that fulfil only the exact mission requirements within specific mission parameters.

It is yet another object of the present invention to provide a method for executing single use systems that deny exploitation by an adversary.

Briefly stated, the invention provides a method for manufacturing and executing single-use systems. Invention provides provably secure system design, instantiated in heterogeneous hardware that exists solely for the lifetime of a mission. More specifically, the present invention provides a functional mission analysis, formal specification and mathematically rigorous machine-checkable representation of a hardware mission instantiation to significantly reduce the vulnerabilities of a mission.

BRIEF DESCRIPTION OF THE DRAWINGS

FIG. 1 is a flowchart depiction of the process flow of the present invention.

DETAILED DESCRIPTION OF THE PREFERRED EMBODIMENT

The present invention achieves provably secure system design method that can be instantiated in heterogeneous hardware, which exists solely for the lifetime of a mission. Through functional mission analysis, formal specification and mathematically rigorous machine-checkable representation of a hardware mission instantiation, the invention can significantly reduce the vulnerabilities of a mission. With the method provided by the present invention the adversary can be held at greater disadvantage through randomization of system attributes, at a scale of one unique combination per hardware instantiation. Through this high entropy in system attributes, a heterogeneous mission from one-time-use instances is produced. This shift from "securing systems" to "assuring missions in hardware" increases the "cost to exploit" for adversaries against any potential weaknesses, and due to the one-time use nature, shrinks the useful window for such exploitation to hours instead of years.

The present invention realizes a vision of enduring assurance by enabling missions through systems without vulnerability while holding at risk those missions of one's adversaries. One of several paths to this end is through just-in-time mission composition in one-time-use hardware. Paramount to this shift in paradigm is the transition from "systems" which currently focus on reuse and homogeneity, to heterogeneous, one-time "instantiations" of missions. The latter coincides with the shift of focus to mission assurance via information assurance instead of cyber security or system assurance. Instead of a baseline system which we define by its properties, the present invention focuses on an instantiation of a mission. This instantiation takes form via a one-time-use hardware design that is created by mission parameters and transformed into its carnal form. The shift away from systems to mission instantiations means that we no longer possess homogenous systems, but rather randomized, heterogeneous entities constructed to perform the mission.

The present invention requires the incorporation of several areas of on-going research. These include but are not limited to functional mission analysis, access control logic and theorem provers to mathematically model and verify the security components of the mission and code. Further, binary randomization and ternary computing may be leveraged to translate the mathematical representation into a hardened one-time-use implementation.

Functional Mission Analysis

Based on System-Theoretic Process Analysis for Security (STPA-Sec), Functional Mission Analysis (FMA) provides a methodology to frame the problem of assuring missions that rely on software-intensive systems. It adopts a top-down approach to frame the problem, identify potential losses and accidents, and identify the associated hazards/constraints. From there, the process enables analysts or engineers to identify unsafe/unsecure control and then establish traceability of hazardous actions and scenarios that violate the constraints to produce losses. In this way, one can map the precursors to a loss regardless of intent or threat capability [2].

Access Control Logic

Access control logic (ACL) provides a means to rigorously and mathematically express policies, trust assumptions and statements pertaining to the decision to permit or deny use of a resource of capability. Coupled with other tools, ACL can specify system behavior in a provable and machine-checkable manner that is congruent with intended behavior and security guidelines [3].

Binary Randomization

Binary randomization introduces entropy into an executable program. Although similar to the concept of address space layout randomization (ASLR), it differs in that the actual binary code blocks are reorganized statically, as opposed to while in memory as with ASLR. While ASLR requires an underlying operating system or memory manager to randomize code, binary randomization is conducted "offline", thus removing the need for run-time support. This is preferable in minimalist systems as it removes the requisite operating system/memory management while still affording a similar security benefit. Randomization thwarts several memory-corruption exploitation techniques.

Ternary Computing

Ternary computing modifies the classic binary "1" and "0" architecture to include a third state. The benefits of this paradigm include higher data throughput, incompatibility with exploitation tools and threats, increased entropy, and selectable backward compatibility with legacy binary code [4].

Method Description

FIG. 1 outlines the present invention's process to transform a mission into assured and provable one-time-use hardware. This process is composed of three stages, which are discussed in more detail in the following subsections: Mission Translation, Assured Intermediate Instantiation, and Assured Hardware Instantiation.

The first step in a high-level description (omitting some intermediate steps) of the method is to "design it right", with a specialized mission state diagram made to fulfil only the exact mission requirements within specific mission parameters 10. Next the invention mathematically transforms a mission state machine 80 into an assured code base 150 that derives its assurance from mathematically proven artifacts created during the state diagram creation process. Next, the invention randomizes system instantiation attributes and properties 90 in a manner that massively denies reconnaissance and exploitation attempts against the mission instance. Finally, the invention implements this assured and randomized mission instance in one-time-use hardware instantiation 220, further removing the malleability of software-based systems commonly exploited by adversaries.

When the invention's process is applied, the result is a provable hardware instantiation 220 of the specific mission. Once finished, the hardware instantiation 220 can be wiped clean for the next instantiation or destroyed. By generating a completely unique hardware instantiation that is mathematically proven and assured for each mission, the invention effectively shifts the paradigm to massively disadvantage the adversary who now must constantly react to assured, ever changing, mission systems.

In addition to the rigor and assurance qualities afforded by this process, mission sets will benefit greatly from the high entropy and heterogeneity of unique mission instances. Each mission instantiation is unique—using randomly selected cryptographic protocols, keys, hardware platform, instruction set architecture, word length, intra- and inter-vehicle protocols, bus controllers, binary layouts, etc. Completely changing the configuration, components and implementation scheme of the mission instance makes it intractable for an adversary to exploit the mission platform in the relatively short lifespan of the mission instance, which is estimated for our purposes at approximately 12 hours.

The present invention's mapping of mission parameters into a mathematically verifiable and provable instantiation in hardware can be applied "just-in-time" for specific mission sets once the mission translation phase is complete, thus drastically reducing the manual effort of the mission translation phase for "boilerplate" missions that recur frequently in operations. Realization of this capability will require investigation into automation of portions of the process and prudent application of the mission mapping phase to enable re-use of the mission state machine only under truly acceptable circumstances.

Mission Translation: Vulnerability Reduction

In the mission translation phase, the invention conducts functional mission analysis (FMA) 20 to decompose the mission into a control action diagram 30, identify hazards and causal factors and ultimately create logical formulae that feed into action control logic (ACL) 40. The ACL 40 allows for semantically specifying the constraints to avoid missions and ensure certain information assurance properties within the mission instantiation. Next, the invention uses higher order logic theorem provers 60 to reproducibly machine-check the proofs 50 for validity 70. If the proofs 50 are valid, we can justify confidence in their ability to satisfy the mission requirements, and only the mission requirements. The last step of this phase produces a provable mission state machine 80. In this manner, the invention is able to reduce vulnerabilities in the system by successfully identifying hazards, control actions, and provably assuring such control actions. In addition, application of FMA 20 aids identification of common pitfalls such as omitted, incomplete, or overly simple scenarios of the mission [2].

This next phase is by nature highly manual. However, for boilerplate missions, reuse of the "provable mission state machine" 80 is possible once the expert work has been finished one time. In contrast, the remaining phases of the process can be largely automated (though this requires some additional research and development). Thus, efficient application of this process as a whole hinges on careful analysis during the mission translation phase to ensure any re-use of the provable mission state machine is truly justified and not a misuse. In cases where reuse of the output of this phase is justified, it is envisioned the application of this invention's process would be fairly streamlined.

Assured Intermediate Instantiation: Deterrence by Capability and Impact Manipulation The second phase of the process translates the assured (proven) mission state machine 80 into an assured intermediate instantiation. In this phase, any source mission (be it generic and recurring or highly specialized and executed once) is transformed into a unique intermediate instantiation. In this phase, system instantiation attributes are randomized 90 to increase the cost of exploitation. A non-exhaustive subset of the system attributes to randomize includes:
  a) Hardware platform (examples: ARM, x86, MIPS, PPC, etc.)
  b) Instruction set architecture/alterations
  c) Ternary or binary system architecture
  d) Harvard or Von Neumann architecture
  e) Command protocols
  f) Cryptographic algorithm
  g) Cryptographic key materials, management scheme, and distribution scheme (as appropriate)
  h) Inter-instantiation protocols
  i) Intra-instantiation protocols/bus choice
  j) Word length Next, the assured mission state machine is translated into an intermediate instantiation that is properly suited to the randomly chosen instantiation attributes. To clarify by example, the mission state machine can be translated 100 into C code for example 110.

In parallel, the ACL proofs are translated 120 into machine-checkable code specifications that are integrated into the source code for the instance itself. These blocks of specification code serve to ensure the conditions necessary for the ACL proofs to remain valid are enforced within the intermediate instantiation. For example, this can take form of ACL proof conditions being translated into Frama-C artifacts written in the C language with safe libraries and strict code standards.

Next, the code specification blocks are integrated into the coded mission state machine 130. In this way, we can guarantee the transitions from states can avoid the hazards identified in the earlier mission translation phase. This produces the final result of the intermediate instantiation phase: the "assured mission intermediate instantiation" 140, which keeping with the earlier example could be a C code base that properly integrated the state machine and code enforcement blocks.

Instead of a homogenous fleet, missions will benefit from highly heterogeneous instantiations. With such heterogeneity, adversaries no longer possess the "one exploit to rule them all" and instead must invest vast amounts of time, money and specialized talent to break one instance. Furthermore, since these instances only exist for the duration of a specific mission execution (merely hours or a day), an adversary has orders of magnitude less time to develop and deliver a customized exploit against the instance. In this manner, we shift the asymmetry to benefit the warfighter and take the advantage from the adversary.

Assured Hardware Instantiation: Minimize Malleability for Adversaries

The third and final phase of the invention's process translates the intermediate instantiation into hardware, thereby removing the malleability adversaries commonly abuse to exact effects. This phase compiles the assured mission intermediate state machine instantiation into a hardware descriptor language (HDL) 150 and mission specific HDL 160. Since the input to this phase was already customized significantly and possesses randomized attributes, this step produces a mission-specific hardware instantiation 170.

It's foreseen that circumstances may preclude application of this process to every component that constitutes a mission instantiation. Some examples of such circumstances are: highly sensitive real-time components, where this application may cause the component to degrade performance outside of timing specifications, lack of access to source code, classification of components or accreditation that removes the ability to modify the component. In such cases, binary randomization 190 of additional system binaries 180 should be used to modify the locations of code in such components in a way as to reduce the efficacy of return oriented programming attacks and other typical exploitation techniques. This will further raise the cost to exploit for an adversary, even on components that cannot receive the full treatment of this process.

The last step of the invention's process is final integration 210. In this step, the randomized binaries 200 and unique hardware instantiation 170 are integrated 210 to form the final one-time-use hardware mission instantiation 220.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A computer-implemented method for executing a mission-specific integrated single-use computer hardware system, the computer-implemented method comprising: defining predefined parameters associated with a mission; and performing a functional mission analysis based on the predefined parameters to decompose the mission into a computerized control action diagram, wherein the functional mission analysis creates logical formulae;
  developing access control logic based on the computerized control action diagram; proving a validity of the access control logic; and producing a finite state machine based on the proven valid access control logic;
  executing the finite state machine representative of the predefined parameters associated with the mission, wherein the mission comprises a predefined computerized process used for a fixed duration and for a single-use, and wherein the finite state machine generates an output; translating the finite state machine to a software code;
  compiling the software code from the finite state machine to create a computerized instantiation from the output of the finite state machine; randomizing the computerized instantiation of the finite state machine, wherein the computerized instantiation comprises attributes of the mission-specific integrated single-use computer hardware system;
  and transforming the computerized instantiation into a mission-specific hardware design computer language representative of the mission-specific integrated single-use computer hardware system.

2. The method of claim 1, wherein the attributes of the mission-specific integrated single-use computer hardware system comprise any of a type of computer hardware platform, an instruction set architecture/alterations of the mission-specific integrated single-use computer hardware system, whether the mission-specific integrated single-use computer hardware system comprises a ternary or binary system architecture, whether the mission-specific integrated single-use computer hardware system comprises a Harvard or Von Neumann architecture, command protocols of the mission-specific integrated single-use computer hardware system, a cryptographic algorithm associated with the mission-specific integrated single-use computer hardware system, cryptographic key materials of the mission-specific integrated single-use computer hardware system, a management scheme of the mission-specific integrated single-use computer hardware system, a distribution scheme of the mission-specific integrated single-use computer hardware system, inter-instantiation protocols of the mission-specific integrated single-use computer hardware system, and intra-instantiation protocols/bus choice of the mission-specific integrated single-use computer hardware system, and a word length associated bits processed by the mission-specific integrated single-use computer hardware system.

3. The method of claim 1, further comprising: translating the proven valid access control logic into a machine checkable specification; inserting the machine checkable specification into the software code; inserting the machine checkable specification into the finite state machine; and creating the computerized instantiation from the finite state machine.

4. The method of claim 3, wherein the mission-specific hardware design computer language comprises a computer hardware descriptor language.

5. The method of claim 3, further comprising instantiating hardware from the mission-specific hardware design computer language.

6. The method of claim 5, further comprising integrating randomized system binaries into the instantiated hardware to introduce system entropy into an executable software program run by the mission-specific integrated single-use computer hardware system.

7. The method of claim 1, wherein the fixed duration of the predefined computerized process is approximately 12 hours.

8. The method of claim 1, further comprising reusing the finite state machine for subsequent missions.

9. A mission-specific integrated single-use computer hardware system comprising: a finite state machine representative of predefined parameters associated with a mission, wherein the mission comprises a predefined computerized process used for a fixed duration and for a single-use, and wherein the finite state machine generates an output;
perform a functional mission analysis based on the predefined parameters to decompose the mission into a computerized control action diagram, wherein the functional mission analysis creates logical formulae;
develop access control logic based on the computerized control action diagram; prove a validity of the access control logic; and produce the finite state machine based on the proven valid access control logic; translate the finite state machine to software code;
the software code compiled from the finite state machine, wherein the software code creates a computerized instantiation of the output of the finite state machine;
randomize the computerized instantiation of the output of the finite state machine, wherein the computerized instantiation comprises attributes of the mission-specific integrated single-use computer hardware system;
and computer architecture to transform the computerized instantiation into a mission-specific hardware design computer language representative of the mission-specific integrated single-use computer hardware system.

10. The system of claim 9, wherein the attributes of the mission-specific integrated single-use computer hardware system comprise any of a type of computer hardware platform, an instruction set architecture/alterations of the computer hardware system, whether the mission-specific integrated single-use computer hardware system comprises a ternary or binary system architecture, whether the mission-specific integrated single-use computer hardware system comprises a Harvard or Von Neumann architecture, command protocols of the mission-specific integrated single-use computer hardware system, a cryptographic algorithm associated with the mission-specific integrated single-use computer hardware system, cryptographic key materials of the mission-specific integrated single-use computer hardware system, a management scheme of the mission-specific integrated single-use computer hardware system, a distribution scheme of the mission-specific integrated single-use computer hardware system, inter-instantiation protocols of the mission-specific integrated single-use computer hardware system, and intra-instantiation protocols/bus choice of the mission-specific integrated single-use computer hardware system, and a word length associated bits processed by the mission-specific integrated single-use computer hardware system.

11. The system of claim 9, wherein the computer architecture is to: translate the proven valid access control logic into a machine checkable specification; insert the machine checkable specification into the software code; insert the machine checkable specification into the finite state machine; and create the computerized instantiation of the output of the finite state machine.

12. The system of claim 11, wherein the mission-specific hardware design computer language comprises a computer hardware descriptor language.

13. The system of claim 11, wherein the computer architecture is to instantiate hardware from the mission-specific hardware design computer language.

14. The system of claim 13, wherein the computer architecture is to integrate randomized system binaries into the instantiated hardware to introduce system entropy into an executable software program run by the mission-specific integrated single-use computer hardware system.

* * * * *